United States Patent [19]
Scott

[11] Patent Number: 5,245,880
[45] Date of Patent: Sep. 21, 1993

[54] GRYOSCOPE CONTROL SYSTEM

[75] Inventor: James N. G. Scott, Edinburgh, United Kingdom

[73] Assignee: GEC Ferranti Defence Systems Limited, Stanmore, United Kingdom

[21] Appl. No.: 931,471

[22] Filed: Aug. 20, 1992

[30] Foreign Application Priority Data

Aug. 22, 1991 [GB] United Kingdom ............... 9118160

[51] Int. Cl.$^5$ .................................................. G01C 19/30
[52] U.S. Cl. ............................................ 74/5.46; 74/5.9
[58] Field of Search ...................... 74/5.46, 5.9, 5.47, 74/5.41; 318/612, 611

[56] References Cited

U.S. PATENT DOCUMENTS

| 3,470,428 | 9/1969 | Gill et al. ...................... 318/612 X |
| 4,267,737 | 5/1981 | O'Connor et al. ...................... 74/5.9 |
| 5,000,053 | 3/1991 | Bouchard et al. ...................... 74/5.46 |

FOREIGN PATENT DOCUMENTS 0193012  9/1990  Japan ..................................... 74/5.46

Primary Examiner—Rodney H. Bonck
Attorney, Agent, or Firm—Spencer, Frank & Schneider

[57] ABSTRACT

A control system for, for example, a null-point gyroscope is provided in which, to minimize stiction, the control system is arranged to apply a decreasing oscillatory drive output to a precessed element of the gyroscope.

16 Claims, 2 Drawing Sheets

GRYOSCOPE CONTROL SYSTEM

FIELD OF THE INVENTION

This invention concerns gyroscopes particularly, but not exclusively, relatively low performance, floated, rate integrating gyroscopes such as are frequently used in attitude and heading reference systems and in moderate performance inertial navigation systems.

BACKGROUND TO THE INVENTION

A typical gyroscope of this type is shown schematically in FIG. 1 of the accompanying drawings the gyroscope comprises a gyro rotor 10 rotatable about an axis H (and thereby producing a momentum vector along the axis). The rotor is electrically driven, power being supplied thereto by leads (not shown). The rotor 10 is mounted within a float 12. The float 12 is a sealed cylindrical vessel pivotable about its cylindrical axis O (the output axis) on stub axles 14. The axles 14 are journalled in bearings 16 mounted to a gyro case 18. The case 18 is sealed and contains a relatively dense fluid which provides both the necessary damping of float rotation and support or the mass of the float when acceleration is applied If the densities of the fluid and float are matched, i.e. neutral buoyancy, there will be no reaction forces at the output axis bearings, when acceleration is applied, and hence no friction torques caused by the bearings which torques give rise to gyro measurement inaccuracies. However, such a gyroscope may be required to operate over a temperature range in excess of 100° C. (e.g. −40° C. to +80° C.). The density of the supporting fluid may change considerably and the reaction loads between the axles 14 and the bearings 16 may vary giving rise to changing friction torques as the gyro temperature changes. To minimise this problem, it has been suggested to excite the bearings 16 and axles 14 by low amplitude oscillation of the float 12 about the output axis O.

A floated rate integrating gyroscope was first described in, for example, GB Patent Specification No. 753449. A fuller description of this type and related modifications can be found in a publication entitled "The anatomy of a gyroscope Part II", pages 55–62, AGARD-AG313 published by AGARDOGRAPH in 1990.

It is conventional to employ miniature ball bearings on the output axis bearings in this type of gyroscope. Referring to FIGS. 2 to 5, the stub axles 14 are generally formed of tungsten carbide and the bearings 16 each comprise a case 20 preferably also made of tungsten carbide. The case 20 supports a plurality, for example seven, steel balls 21. In a typical small gyroscope, the balls 21 may each have a diameter of 0.45 mm, the diameter of the axles 14 may be 0.55 mm. At such sizes, it is conventional to provide clearance between the axle 14 and the balls of 2.5 μm. This clearance is sufficient to permit the balls 21 to adopt various geometric configurations depending on the forces existing at the pivot. Consider the situation in which the gyro is operating at a temperature at which the float is not neutrally buoyant (e.g. less buoyant) in the flotation fluid. In the presence of acceleration orthogonal to the output axis O, due to gravity or vehicle manoeuvres, some reaction loads must be transmitted via the output axis bearings to support the residual 'unfloated' mass of the float. FIG. 3 shows the situation in which the only force acting at the pivot 14 is that due to gravity and the balls 21 have moved, within their clearance in the case 2, to a minimum energy position. If the gyroscope is subjected to additional acceleration orthogonal to the output axis O, by lateral acceleration due to vehicle manoeuvres, then a new resultant acceleration vector will act on the axle 14, as shown in FIG. 4. The balls 21 will be displaced and will adopt a new minimum energy position in the case 20 as shown (greatly exaggerated) in FIG. 4. When the lateral acceleration ceases, there is a time interval when the situation shown in FIG. 5 pertains. The bearing arrangement there shown gives rise to a different frictional torque value between the axles 14 and the bearings 16 whereby the gyroscope bias is changed thus producing potential system errors.

It is an object of the present invention to provide an improved gyroscope control system wherein the affects of the aforesaid problem are minimised.

SUMMARY OF THE INVENTION

According to the present invention, there is provided a control system for a gyroscope comprising a rotor rotatable about a first axis to produce a momentum vector, a mount for the rotor pivotable about a second orthogonal axis, the gyroscope being responsive to rotation about a third axis orthogonal to the first and second axes, to cause rotation of the mount about the second axis, and torque applying means for counter-rotating the mount about the second axis, wherein the control system comprises means for causing the torque applying means to apply a temporary, decreasing oscillatory torque to the mount about the second axis.

Preferably, the gyroscope is of the floated type, and the mount comprises a sealed float containing the rotor.

Conveniently, the torque applying means comprises permanent magnets and cooperating field coils, there being a gyro case within which the mount is journalled for rotation about the second axis, the permanent magnets or the field coils being fixed to the case and the field coils or the permanent magnets being fixed to the mount.

Electromagnetic sensing means may be provided for sensing rotation of the mount about the second axis.

The control means conveniently applies torque to the mount to rotate the mount, there being a feedback loop for determining the torque to be applied, in dependence upon the output of the electromagnetic sensing means, to prevent rotation of the mount.

Output means are provided for generating a temporary decreasing, oscillatory output for supply to the torque applying means to produce the oscillatory torque. The output advantageously has the form of a decreasing amplitude sinusoid, the frequency of which is conveniently chosen to be well within the bandwidth of the feedback loop.

Timing means may be provided for causing the output means to produce its output at predetermined intervals Alternatively, and preferably, the timing means may control the output means to produce an output only after a significant rotation of the gyroscope about the third axis.

The timing means may also be inhibited during a critical or highly dynamic period of gyroscope motion.

BRIEF DESCRIPTION OF THE DRAWINGS

The invention will be described further, by way of example, with reference to the accompanying drawings, in which.

DETAILED DESCRIPTION OF THE INVENTION

Figure 1:
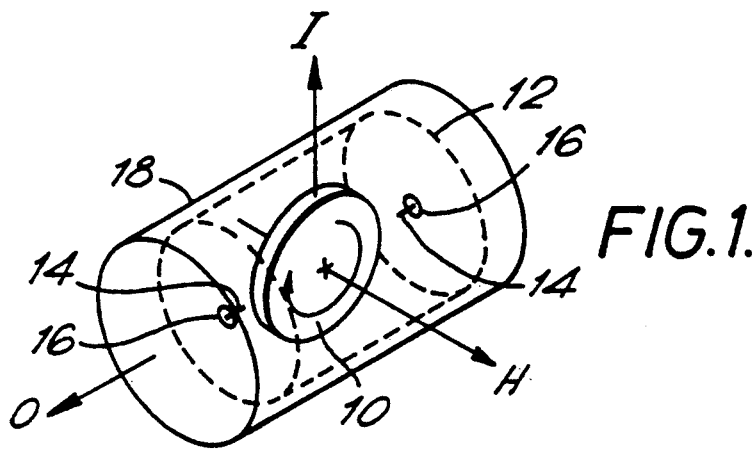
FIGS. 1 to 5, as above described, are illustratory of the type of gyroscope to which the invention is particularly applicable.
Figure 2:
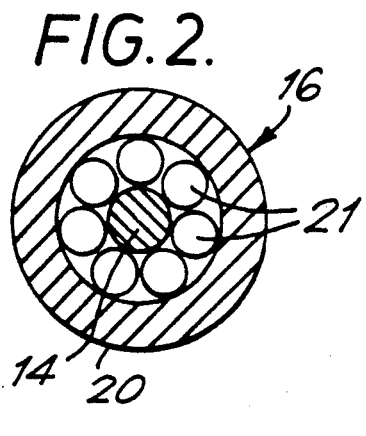
Figure 3:
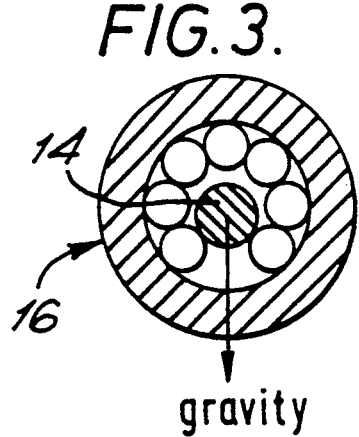
Figure 4:
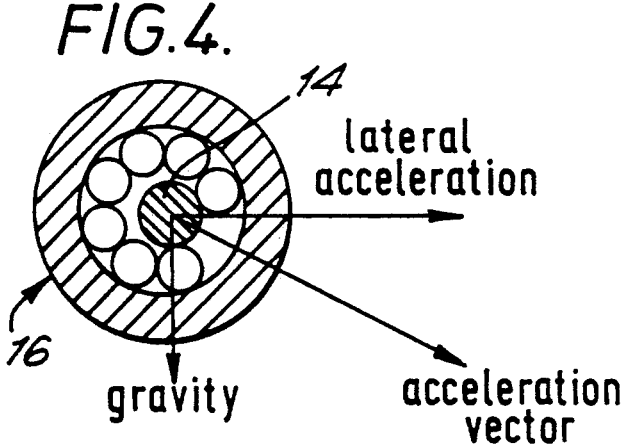

In the drawings like reference numeral have been used to indicate similar parts.

Figure 6:
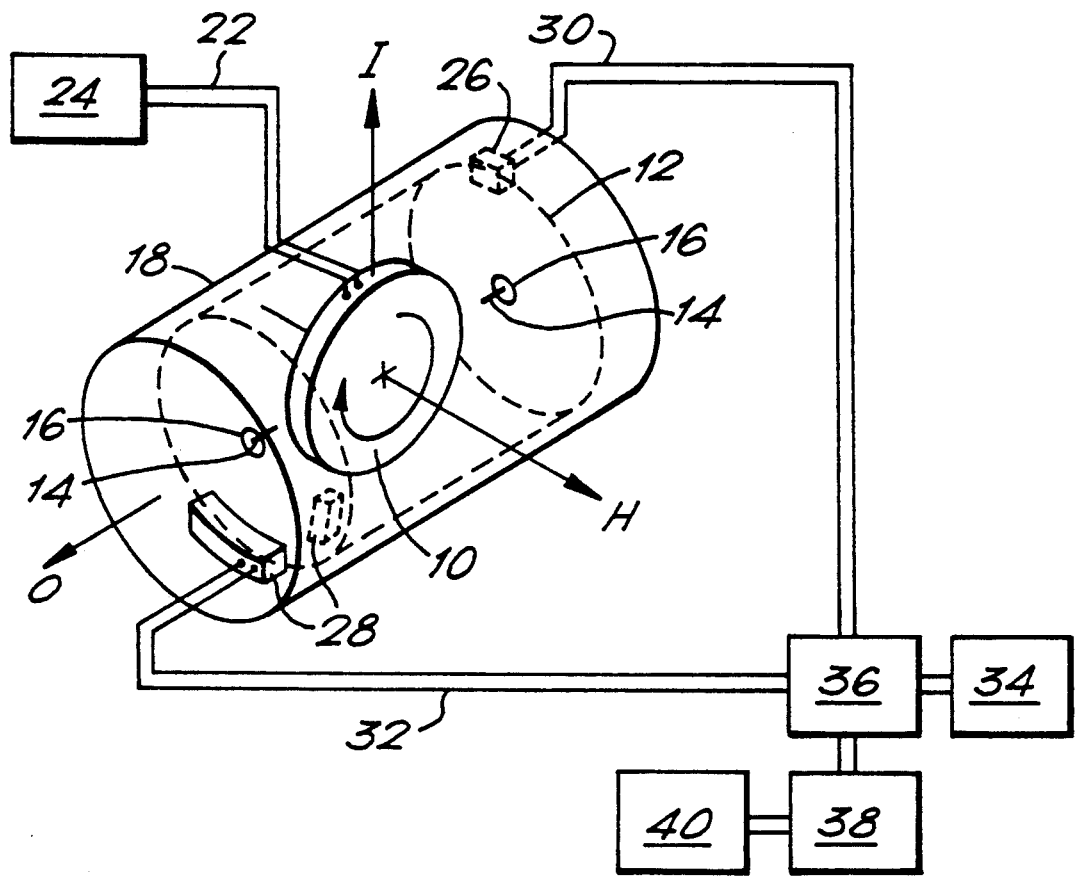
FIG. 6 is a view, similar to FIG. 1 of a gyroscope incorporating a control system of the present invention.

A gyroscope having a control system of the present invention, as illustrated diagrammatically in FIG. 6 is similar in construction to the gyroscope illustrated in FIG. 1 and described above. Parts described in relation to FIG. 1 have been given the same reference numerals and will not be described further. Not shown in FIG. 1 are ligature leads 22 for supplying electrical power from a source 24 to the rotor 10; an electromagnetic sensing device 26 for sensing rotation of the float 12 about the axis O; torque applying means 28 in the form of permanent magnets (of which only one is shown) and field windings (only one of which is shown), the magnets being secured to the float 12 or to the case 18 whilst the field windings are secured to the case 18 or to the float 12; electrical leads 30 to the sensing device 26; electrical power leads 32 for supplying power from a source 34 to the field windings of the torque applying means 28; and control means 36 for controlling the torque applying means by means of feedback loop including the magnetic sensing device 26. The foregoing are well known in the art and are therefore shown diagrammatically. It is also known in the art to use capacitative or optical sensing of rotation of the float 12 about the axis O, and for other forms of torque applying means 28 to be provided.

The gyroscope is arranged to sense rotation about one axis, in this case the axis I. The gyroscope is preferably stabilised physically or electronically in respect of motion about the two other orthogonal axes.

The gyroscope has a null point preferably with the axes H and O horizontal. Rotation of the gyroscope about the axis I causes precession tending to rotate the float 12 about the axis O. Such tendency is sensed by the sensing device 26 outputting a signal to the control means 36. The control means controls the supply of power from the power source 34 to the torque applying means 28 to apply a torque to the float 12 to counteract the precession induced torque to maintain the float 12 at its null point. Appropriate anti-hunting steps are taken. The magnetic sensing device 26 supplies continuous signals to the control means 36 at all times during rotation about the axis I to maintain the float 12 at its null point. A feedback loop is thus employed.

Figure 5:
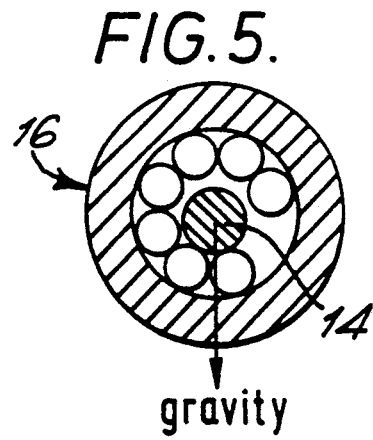
Figure 7:
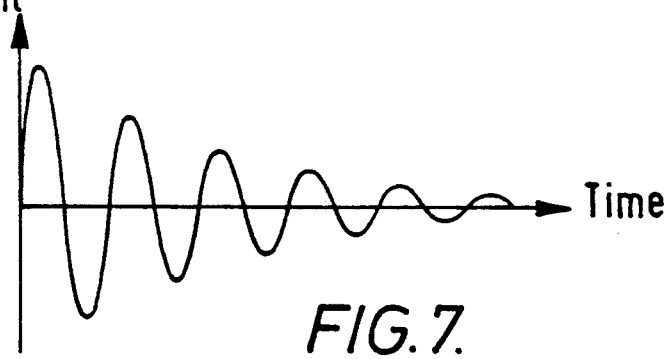
FIG. 7 is graphical representation of a preferred waveform of a "disturbance" utilised in carrying out the invention.

Referring to FIG. 5, to overcome the disadvantage there shown, in accordance with the method of the invention, a disturbance is superimposed on the supply of power from the source 34 to the torque applying means 28. The disturbance is generated by a control system comprising output means 38 and takes the form of a decreasing amplitude sinusoidal waveform as shown in FIG. 7. Timing means 40 are provided. The timing means triggers the output means to supply the disturbance at selectable intervals. The intervals may be regular e.g. once per minute, or may be irregular or may be in response to predetermined conditions such as in response to a significant rotation of the gyroscope about the axis I. Further, the timing means may be pre-programmed or may be controlled in real time so as to inhibit triggering of a disturbance by the output means in response to predetermined critical conditions or during highly dynamic periods of gyroscope motion.

The invention is not confined to the precise details of the foregoing description. For example, the output means 38 and/or the timing means 40 may form an integral part of the control means 36 and not separate units as shown. The disturbance may be of square waveform Its period of decay may be variable.

The invention is applicable to the control of other gyroscope types than the floated integrating rate type described.

Other variations are possible within the spirit and scope of the present invention as defined by the appended claims.

I claim:

1. A control system for a gyroscope comprising a rotor rotatable about a first axis, a mount for said rotor pivotable about a second orthogonal axis, said gyroscope being responsive to rotation about a third axis, orthogonal to said first and second axes, to cause rotation of said mount about said second axis, and torque applying means for counter-rotating said mount about said second axis, wherein the control system comprises means for causing said torque applying means to apply a temporary, decreasing oscillatory torque to said mount, about said second axis.

2. A control system for a gyroscope as claimed in claim 1, wherein said mount comprises a sealed float wherein is mounted said rotor.

3. A control system for a gyroscope as claimed in claim 1 wherein said torque applying means comprises permanent magnets secured to one of a gyro case and said mount, and field coils secured to another of said gyro case and said mount, said mount being journalled for rotation about said second axis within said gyro case on energisation of said torque applying means.

4. A control system for a gyroscope as claimed in claim 1 further including sensing means for sensing rotation of said mount about said second axis.

5. A control system for a gyroscope as claimed in claim 4, wherein said control means is arranged to control application of power to said torque applying means, there being a feedback loop including said sensing means for determining the power to be supplied to said torque applying means to prevent rotation of said mount about said second axis.

6. A control system for a gyroscope as claimed in claim 1 further including output means for generating a temporary, decreasing oscillatory output for supply to said torque applying means.

7. A control system for a gyroscope as claimed in claim 6, wherein said output means is arranged to generate a decreasing amplitude sinusoidal output.

8. A control system for a gyroscope as claimed in claim 6, wherein timing means are provided for causing said output means to generate its output.

9. A control system for a gyroscope as claimed in claim 8, including inhibit means for preventing said timing means from causing an output to be generated by said output means.

10. A method of controlling a gyroscope comprising a rotor rotatable about a first axis, a mount for said rotor pivotable about a second orthogonal axis, the gyroscope being responsive to rotation about a third axis, orthogonal to said first and second axis, and torque applying means for counter-rotating said mount about said second axis, the method comprising the step of controlling said torque applying means to apply a temporary, decreasing oscillatory torque to said mount, about said second axis.

11. A gyroscope comprising a rotor rotatable about a first axis, a mount for said rotor pivotable about a second orthogonal axis, said mount comprising a sealed float wherein is mounted said rotor, said gyroscope being responsive to rotation about a third axis, orthogonal to said first and second axes, to cause rotation of said mount about said second axis, torque applying means for counter-rotating said mount about said second axis, and means for controlling said torque applying means to apply a temporary, decreasing oscillatory torque to said mount, about said second axis.

12. A gyroscope as claimed in claim 11, wherein said torque applying means comprises permanent magnets secured to one of a gyro case and said mount, and field coils secured to another of said gyro case and said mount, said mount being journalled for rotation about said second axis within said gyro case on energisation of said torque applying means.

13. A gyroscope as claimed in claim 11 further including sensing means for sensing rotation of said mount about said second axis, said sensing means forming part of a feedback loop for determining power to be supplied to said torque applying means to prevent rotation of said mount about said second axis.

14. A gyroscope as claimed in claim 11 further including output means for generating a temporary, decreasing oscillatory output for supply to said torque applying means.

15. A gyroscope as claimed in claim 14, wherein said output means is arranged to generate a decreasing amplitude sinusoidal output.

16. A gyroscope as claimed in claim 15 further including timing means for causing said output means to generate its output, and inhibit means for selectively preventing said timing means from causing an output to be generated.

* * * * *